(12) United States Patent
Smith et al.

(10) Patent No.: US 8,802,041 B1
(45) Date of Patent: Aug. 12, 2014

(54) DECONTAMINATION OF RADIOACTIVE METALS

(71) Applicant: Toxco, Inc., Anaheim, CA (US)

(72) Inventors: W. Novis Smith, Philadelphia, PA (US); David S. Eaker, Lenoir City, TN (US)

(73) Assignee: Toxco, Inc., Anaheim, CA (US)

( * ) Notice: Subject to any disclaimer, the term of this patent is extended or adjusted under 35 U.S.C. 154(b) by 0 days.

(21) Appl. No.: 14/163,593

(22) Filed: Jan. 24, 2014

(51) Int. Cl.
*C01G 53/04* (2006.01)
*C01G 53/06* (2006.01)

(52) U.S. Cl.
USPC .......... 423/34; 423/50; 423/92; 423/104; 423/105; 423/140; 423/2; 588/15

(58) Field of Classification Search
None
See application file for complete search history.

(56) References Cited

U.S. PATENT DOCUMENTS

| | | | |
|---|---|---|---|
| 3,853,725 A | | 12/1974 | Skarbo |
| 3,891,741 A | | 6/1975 | Carlin et al. |
| 3,928,153 A | | 12/1975 | Gendreon et al. |
| 4,162,296 A | | 7/1979 | Muller et al. |
| 4,196,076 A | | 4/1980 | Fujimoto et al. |
| 4,226,640 A | * | 10/1980 | Bertholdt .......... 134/3 |
| 4,528,165 A | | 7/1985 | Friedman |
| 4,624,703 A | | 11/1986 | Vanderpool et al. |
| 4,718,996 A | | 1/1988 | Vanderpool et al. |
| 4,808,034 A | | 2/1989 | Birch |
| 5,262,019 A | * | 11/1993 | Snyder et al. .......... 205/596 |
| 5,439,562 A | * | 8/1995 | Snyder et al. .......... 205/594 |
| 5,458,745 A | * | 10/1995 | Hradil .......... 205/589 |
| 7,988,937 B1 | | 8/2011 | Smith et al. |
| 2011/0142735 A1 | * | 6/2011 | Watanabe et al. .......... 423/2 |

* cited by examiner

*Primary Examiner* — Steven Bos
(74) *Attorney, Agent, or Firm* — RatnerPrestia

(57) ABSTRACT

There is provided a process for decontaminating and converting volumetrically contaminated radioactive metals, especially nickel, and recovering a decontaminated metal hydroxide or metal carbonate. The process includes the use of hydrogen peroxide to oxidize and remove nucleotides.

14 Claims, No Drawings

DECONTAMINATION OF RADIOACTIVE METALS

FIELD OF THE INVENTION

The present invention relates to an improved process for the decontamination and conversion of volumetrically contaminated radioactive metals, especially nickel and its alloys. According to the invention, the metals may be reduced in size to filings, powders, flakes or the like, and then treated in an aqueous acid solution with an oxidative environment to oxidize and dissolve the metal and nucleotides. The resulting solution is treated to precipitate some of the nucleotides, filtered and passed through an anion exchange column to remove more of the nucleotides and then the metal is precipitated to provide a decontaminated metal hydroxide or metal carbonate.

BACKGROUND OF THE INVENTION

High purity metals and alloys are used in the upgrading and processing of nuclear fuels and containment of nuclear reactor fuel rods. These same metals and their alloys are used in the containment of the actual reactors both for power generation and for military vessels such as submarines. These same metals during the course of their service come under constant high radiation doses and accumulate low to moderate levels of radioactivity within the metal itself. This service-acquired inherent radioactivity is termed "volumetric radioactivity," as opposed to surface radioactivity which is due to radioactive particles on the surface of the metal form or part. The surface radioactivity can be washed or scoured off, but most of the volumetric radioactivity cannot be removed by physical processes such as washing or heating even up to the vary high melting point of the metal or metal alloy. Nickel and its alloys, for example, are widely used for these applications and accumulate various levels of volumetric radiation due to technetium 99 (a beta radiation emitter) and other radioactive isotopes. These radioactive isotopes include both gamma and beta emitters which are of concern along with the weaker alpha emitters. The removal of the volumetric radioactive isotopes from the volumetrically radioactive contaminated nickel and its alloys is of significant importance in order to recover this valuable metal.

Since nickel is the preferred containment material for nuclear processing and reactors, volumetrically radioactive contaminated nickel will continue to be generated. The reuse of this contaminated nickel by re-melting it and restricting it only for nuclear use can be done but there is a quantity mismatch since there is a very large inventory of this volumetrically contaminated nickel already being stockpiled awaiting some means of purifying it back to background levels and for reuse in commercial applications. This contaminated nickel at its current volumetric radioactive levels cannot be recycled back into the normal commercial metal alloying and fabrication processes. As older nuclear reactors and older nuclear fuel processing facilities are decommissioned, such contaminated nickel and nickel alloys continue to be generated. Not only is the economic loss and value of major concern, the necessity to recycle and reuse the limited amount of metals such as nickel is a worldwide concern in order to maintain the long term availability of such important metals.

Various decontamination processes are known in the art, specifically for decontamination of nickel. Nickel can be recovered by selectively stripping from an acidic solution by electrowinning. See U.S. Pat. No. 3,853,725. Nickel may also be removed by liquid, liquid extraction or solvent extraction. See U.S. Pat. Nos. 4,162,296 and 4,196,076. Further, various phosphate type compounds have been used in the removal of nickel. See U.S. Pat. Nos. 4,162,296; 4,624,703; 4,718,996; 4,528,165 and 4,808,034.

U.S. Pat. No. 7,988,937 to Smith et al discloses a method for the volumetric decontamination of radioactive material in which the metals are recovered in the form of metal hydroxides. The present application provides an improvement in costs and efficiency by the use of different oxidative conditions and by recovering metal carbonates or hydroxides.

It is known that metallic nickel, contaminated with fission products, can be decontaminated to remove any actinides present by direct electro-refining based on the differences in reduction potential in the electromotive force (emf) series. Actinide removal is favored by two phenomena during electro-refining. Actinides have a significantly higher reduction potential relative to nickel and they are normally won from molten salt electrolyte rather than from aqueous electrolyte. See U.S. Pat. Nos. 3,928,153 and 3,891,741, for example. The prior art methods of decontaminating metals with surface radioactivity cannot be used for the removal of volumetric radioactive isotopes.

In spite of these disclosures, there remains a need for an economical and efficient method of decontaminating radioactive metals.

SUMMARY OF THE INVENTION

One aspect of the present invention provides a process to decontaminate volumetrically contaminated radioactive metals and recover them as non-radioactive metal compounds. Another aspect of the invention provides a method of recovering nickel and its alloys from volumetrically contaminated metals containing nickel or its alloys. Yet another aspect of the invention involves recovering Tc99 from volumetrically contaminated metals.

According to one embodiment of the present invention, there is provided a method for the decontamination of volumetrically contaminated radioactive metals. The method comprises the steps of:

A) dissolving the radioactive metals in an acid solution containing about 0.5 to about 2.0% by weight, based on the weight of radioactive metals, of an iron salt or oxide or combination thereof to obtain a first solution;

B) neutralizing the first solution from step A) to a pH of about 4.5 to about 5 with at least one base (which may be selected from the group consisting of alkali metal hydroxides and calcium hydroxide) to obtain a first slurry containing precipitated ferric hydroxide;

C) treating the slurry obtained in step B) with hydrogen peroxide, to oxidize any oxidizable nucleotides present, and with an alkali metal fluoride to obtain a second slurry;

D) filtering the second slurry of step C) to remove the precipitated ferric hydroxide and any impurities absorbed on the precipitated ferric hydroxide and to obtain a filtrate;

E) passing the filtrate from step D) through an anion exchange column maintained at a temperature of below about 35° C. so as to absorb nucleotides onto said anion exchange column to obtain an eluent;

F) adjusting the pH of the eluent of step E) to a pH of from about 10 to about 11 with at least one base selected from the group consisting of alkali metal hydroxides and alkali metal carbonates to obtain a product; and G) filtering the product from step F) to recover metals in a carbonate or hydroxide form.

In another embodiment of the invention, a process for decontaminating radioactive nickel is provided which comprises the steps of:

a) dissolving radioactive nickel particles in aqueous nitric acid under an inert atmosphere to obtain a first solution;

b) adding 0.5 to about 2.0% by weight of ferric nitrate, based on the weight of radioactive nickel particles, to the first solution obtained in step a) to obtain a second solution;

c) neutralizing the second solution from step b) with calcium hydroxide and at least one alkali metal hydroxide to a pH of about 4.5 to about 5 to obtain a first slurry containing precipitated ferric hydroxide;

d) adding a solution of hydrogen peroxide to the first slurry obtained in step c) to oxidize any oxidizable nucleotides present to obtain a second slurry;

e) adding a solution of sodium fluoride to the second slurry to precipitate soluble calcium present in the second slurry to obtain a third slurry;

f) filtering the third slurry of step e) to obtain a filtrate and passing the filtrate through a strong anion exchange column which has been conditioned and adjusted to a pH of 5 and a temperature below 35° C. to obtain an eluent;

g) adjusting the eluent obtained in step f) with an alkali metal carbonate to a pH of from about 10 to about 11 to obtain a product; and h) filtering the product obtained in step g) to recover nickel carbonate.

DETAILED DESCRIPTION OF THE INVENTION

The present invention relates to an improved process for the recovery of metals in a carbonate or hydroxyl form (e.g., as a metal carbonate or metal hydroxide) from volumetrically contaminated radioactive metals. The radioactive metals which may be processed by the present invention include nickel, lead, cadmium, zinc, copper, manganese and silver as well as alloys of these metals, but are not limited to such. The radioactive metals may be in particulate form, such as filings, powder, shot, flakes or the like.

Accordingly, the process may comprise the steps of:

A) dissolving (preferably slowly) the radioactive metals in an acid solution (e.g., an aqueous nitric acid solution or an aqueous sulfuric acid solution) containing about 0.5 to about 2.0% by weight of an iron salt or oxide or combination thereof (e.g., a soluble ferric or ferrous iron salt or oxide, preferably ferric chloride, ferrous ammonium sulfate, and/or ferric nitrate).

Dissolution of the metals may involve conversion of the metal into water-soluble nitrate or sulfate species (e.g., nickel nitrate, nickel sulfate). Preferably, the iron compound is added after the metals have dissolved and the temperature of the solution is about 35° C.

It has been found that in step A) it is preferable to add less than 30% of the nitric acid or sulfuric acid and wait for reaction of the metal to be initiated before adding the rest of the nitric or sulfuric acid (which is typically in the form of an aqueous solution) in order to prevent the reaction from becoming too vigorous. The metal, which is typically in the form of particles or pieces, may be covered with an impervious oxide layer which is slower to dissolve causing an induction period. After this induction period, the direct reaction with the acid proceeds rapidly. The rest of the calculated amount of acid (e.g., nitric acid) with slight excess can then be added to maintain a good but controllable rate. It is also preferred to blanket the surface of the reactor within which the metal and acid (e.g., nitric acid) solution are contained to remove the hydrogen that is formed during the dissolution of the metal. The radioactive metal may initially be admixed in particulate form with a quantity of water, with the acid needed for the desired dissolution then being added to such admixture, which may be stirred or otherwise agitated during the addition of acid.

It has also been found that adding about 0.5 to about 2 percent by weight of soluble ferric nitrate or other ferric or ferrous compound in step A) after the reaction (dissolution of the metal) is complete is more effective and controllable for taking out the uranium and thorium and other nucleotides along with such other nucleotides such as Technetium 99 (Tc99). The amount of iron compound utilized is based on the initial weight amount of radioactive metal to be treated.

In addition to the iron compound(s), one or more aluminum salts such as aluminum nitrate may be used in step A). The aluminum salt(s) may, for example, be added to the acid solution before or after adding the iron compound(s) or at the same time as the iron compound(s).

B) neutralizing the solution from step A) with one or more bases to a pH of about 4.5 to about 5 to obtain a first slurry containing precipitated ferric hydroxide;

The bases used for such neutralization, which generates ferric hydroxide in the form of a precipitate, may be selected from the group consisting of alkali metal hydroxides, calcium hydroxide and combinations thereof. In one advantageous embodiment of the invention, the neutralization is carried out in a stepwise manner, where in a first neutralization step the solution from step A) is treated with an amount of calcium hydroxide effective to achieve a pH of from about 3 to about 4 and then in a second neutralization step the solution from step A) is further treated with an amount of an alkali metal hydroxide (e.g., sodium hydroxide, potassium hydroxide) effective to achieve a pH of from about 4.5 to about 5.

Treatment with calcium hydroxide and/or by alkali metal hydroxide generates insoluble ferric hydroxide, which can then be separated by filtration along with the insolubilized nucleotides and fluorides formed in subsequent steps.

C) Treating the slurry obtained in step B) with hydrogen peroxide to oxidize any oxidizable nucleotides present in the product obtained from step B), particularly to oxidize Tc99 to the technate anion. Step C) also involves treating the slurry with an alkali metal fluoride.

In step C) it is preferred to add 5%-10% of aqueous 35% hydrogen peroxide to be certain that the above-mentioned technate anion will be formed for removal in the subsequent ion-exchange column treatment step. The product from step B) may be contacted with hydrogen peroxide for a time and at a temperature effective to achieve the desired degree of oxidation. Typically, reaction times of from about 5 minutes to about 1 hour and reaction temperatures of from about 20° C. to about 50° C. will be sufficient. The amount of hydrogen peroxide used may be selected based on the concentration of oxidizable nucleotides present in the product obtained from step B).

Combining an alkali metal fluoride with the product obtained in step B) serves to precipitate the soluble calcium and some nucleotides that may be present in the product (typically, such precipitates will be in the form of fluorides). Suitable alkali metal fluorides include, for example, sodium fluoride. The alkali metal fluoride may be advantageously combined with the product from step B) while in the form of an aqueous solution.

In one embodiment of the invention, the product of step B) is first treated with hydrogen peroxide and then with the alkali metal fluoride, but other orders of treatment may be practiced.

D) filtering the slurry produced in step C) to remove the precipitated species formed in preceding steps, including for example the ferric hydroxide formed and any impurities absorbed on the ferric hydroxide.

Filtration may be carried out in any manner known in the art for separating particulates from a liquid phase; as used herein, the terms filtering and filtration include techniques such as decantation and centrifugation. Step D) results in the generation of a filtrate containing solubilized species, such as, for example, metal nitrates and/or sulfates.

E) passing the filtrate from step D) through an anion exchange column at a temperature below about 35° C. so as to absorb any nucleotides and Tc99 onto said anion exchange column and to obtain an eluent.

The anion exchange resin in the column is preferably a strong base anionic exchange resin (e.g., a quaternary amine-functionalized crosslinked polystyrene resin) such as SIR-110-HP resin, sold by Resin Tech of New Jersey and supplied as a chloride exchange resin, but the invention is not limited to such. Other suitable resins that can be used include DOW 550A resin, from the Dow Chemical Company. The anion exchange resin preferably is conditioned prior to use using a concentrated solution of sodium sulfate or sodium nitrate at a pH of about 3 to about 6, for example. The filtrate is passed through the anion exchange column to obtain an eluent.

F) adjusting the pH of the eluent of step F) to a pH of about 10 to about 11 with a base selected from the group consisting of alkali metal hydroxides and alkali metal carbonates (adjusting the pH in this way leads to precipitation of metal carbonates or metal hydroxides from the filtrate, depending upon the identity of the base(s) used for the pH adjustment), and then G) filtering the resulting product from step F) to recover the metal carbonates and/or metal hydroxides precipitated as a result of step F).

The alkali metal hydroxide utilized in step F) may be, for example, sodium hydroxide or potassium hydroxide and the alkali metal carbonate may be, for example, sodium carbonate or potassium carbonate. Advantageously, sodium carbonate is used in step F) and a metal carbonate such as nickel carbonate is formed and recovered in step G).

After the filtrate has been passed through the anion exchange column to obtain the eluent, the anion exchange column may be regenerated and nucleotides such as Tc99 recovered from the resin by treatment with a solution of sodium nitrate, sodium sulfate, ammonium nitrate or ammonium sulfate at a pH of about 4.5 to about 5 and a temperature below 35° C.

A particularly advantageous process for the decontamination of radioactive nickel comprises the steps of:
a) dissolving radioactive nickel particles in aqueous nitric acid under an inert atmosphere;
b) adding about 0.5 to about 2.0% by weight of ferric nitrate, based on the weight of radioactive nickel particles, to obtain a solution;
c) neutralizing the solution from step b) with calcium hydroxide to a pH of about 3 to about 4 and then further neutralizing the solution to a pH of about 4.5 to about 5 using an alkali metal hydroxide, thereby precipitating ferric hydroxide;
d) reacting hydrogen peroxide with the product of step c) to oxidize any oxidizable nucleotides present;
e) adding a solution of sodium fluoride to the product of step d) to precipitate calcium fluoride;
f) filtering the product of step e) to obtain a filtrate and passing the filtrate through a conditioned anion exchange column which has been adjusted to a pH of 5 and to a temperature below 35° C. to obtain an eluent;
g) reacting the eluent of step f) with an alkali metal carbonate, preferably sodium carbonate, to convert nickel nitrate to nickel carbonate; and then
h) filtering to recover the nickel carbonate.

The present invention will now be described with reference to the following examples, which serve to illustrate the various embodiments of the present invention and are not intended to be limiting. The skilled person will appreciate that modifications are within the spirit and scope of the invention.

EXAMPLE 1

20 grams of radioactive nickel metal turnings were added, with stirring, to 125 mL water. 40 g of 70% nitric acid was then added, and the slurry was heated to 35° C. After 1 hour, no pieces of nickel were observed and 1 g of ferric nitrate nonahydrate which contains 14% iron was then added (0.7% of the nickel weight). The solution was stirred another 10 minutes and then partially neutralized with 2 g of calcium hydroxide. The mixture was then further neutralized with 50% sodium hydroxide until a pH of 4.5-5 was achieved to precipitate all of the iron hydroxide. The slurry was then heated to 40° C. and 12 g of 35% hydrogen peroxide was added. 5 mL of 10% sodium fluoride solution was thereafter added to precipitate all the soluble calcium. The resulting slurry then was filtered to separate the precipitates, thereby producing a filtrate. This step completely removed the radioactive Thorium and Uranium and other nucleotides and some of the Technetium 99.

The resulting emerald green solution obtained as the filtrate was passed down an anion exchange column which had been conditioned with sodium nitrate solution to remove chloride, with the pH of the column adjusted to 5 prior to the nickel solution treatment.

The resulting emerald green solution obtained as an eluent was polished-filtered to remove any resin particles that may have broken loose. The pH of this solution was adjusted to pH 10-11 with 50% sodium hydroxide solution with stirring to precipitate all of the non-radioactive nickel as non-radioactive nickel hydroxide. The resultant pale green powder was dried at 80-100° C. The yield was quantitative. The clear filtrate was then passed through a fresh anion exchange column to further reduce activity below background level.

EXAMPLE 2

380 g of an aqueous solution of 15% sodium carbonate (0.57 m) was added over 20 minutes to a stirred solution of 500 g of a 15% nickel sulfate (0.49 m) obtained from the ion exchange column, which had substantially lowered the radioactivity level of the solution. The resulting slurry was stirred for an additional 30 minutes and filtered. The pale green cake of nickel carbonate was washed three times with water and then dried at 120° C. for six hours. The yield was 56 g of nickel carbonate.

EXAMPLE 3

22 grams of radioactive nickel metal turnings were added, with stirring, to 125 mL water. 22 g of sulfuric acid was then added, and the slurry was heated to 35° C. After 1 hour, no pieces of nickel were observed and 1 g of ferric nitrate nonanhydrate which contained 14% iron was then added (0.7% of the nickel weight). The solution was stirred another 10 minutes and then partially neutralized with 2 g of calcium hydroxide. The mixture was then further neutralized with 50% sodium hydroxide until a pH of 4.5-5 was achieved to precipitate all of the iron hydroxide. The slurry was then heated to 40° C. and 12 g of 35% hydrogen peroxide was added. 5 mL of 10% sodium fluoride solution was added to precipitate all the soluble calcium. The resulting slurry then was filtered. This step completely removed the radioactive Thorium and Uranium and other nucleotides and some of the Technetium 99.

The resulting emerald green solution obtained as the filtrate was passed down an anion exchange column which had been conditioned with sodium nitrate solution to remove chloride, with the pH of the column adjusted to 5 prior to the nickel solution treatment.

The resulting emerald green solution obtained as an eluent was polished-filtered to remove any resin particles that may have broken loose. The pH of this solution was adjusted to pH 10-11 with 50% sodium hydroxide solution with stirring to precipitate all of the non-radioactive nickel as non-radioactive nickel hydroxide. The resultant pale green powder was dried at 80-100° C. The yield was quantitative. The clear filtrate was then passed through a fresh anion exchange column to further reduce activity below background level.

EXAMPLE 4

20 grams of radioactive nickel metal turnings were added, with stirring, to 125 mL water. 40 g of 70% nitric acid was then added, and the slurry was heated to 35° C. After 1 hour, no pieces of nickel were observed and 1 g of ferric nitrate nonahydrate which contains 14% iron was then added (0.7% of the nickel weight) and 1 g aluminum nitrate was added. The solution was stirred another 10 minutes and then partially neutralized with 2 g of calcium hydroxide. The mixture was then further neutralized with 50% sodium hydroxide until a pH of 4.5-5 was achieved to precipitate all of the iron hydroxide. The slurry was then heated to 40° C. and 12 g of 35% hydrogen peroxide was added. 5 mL of 10% sodium fluoride solution was added to precipitate all the soluble calcium. The resulting slurry then was filtered. This step completely removed the radioactive Thorium and Uranium and other nucleotides and some of the Technetium 99.

The resulting emerald green solution obtained as the filtrate was passed down an anion exchange column which had been conditioned with sodium nitrate solution to remove chloride, with the pH of the column adjusted to 5 prior to the nickel solution treatment.

The resulting emerald green solution obtained as an eluent was polished-filtered to remove any resin particles that may have broken loose. The pH of this solution was adjusted to pH 10-11 with 50% sodium hydroxide solution with stirring to precipitate all of the non-radioactive nickel as non-radioactive nickel hydroxide. The resultant pale green powder was dried at 80-100° C. The yield was quantitative. The clear filtrate was then passed through a fresh anion exchange column to further reduce activity below background level.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been fully described above with particularity and detail in connection with what is presently deemed to be the most practical and useful embodiments of the invention, it should still be apparent to those of ordinary skill in the art that numerous modifications, including, but not limited to, variations in materials, form, function and manner of operation and use may be made, without departing from the principles and concepts of the invention as set forth in the claims.

What is claimed is:

1. A process for the recovery of metals in a carbonate or hydroxide form from volumetrically contaminated radioactive metals, wherein the process comprises the steps of:
    A) dissolving the radioactive metals in an acid solution containing about 0.5 to about 2.0% by weight, based on the weight of radioactive metals, of an iron salt or iron oxide or combination thereof to obtain a first solution;
    B) neutralizing the first solution from step A) to a pH of about 4.5 to about 5 with at least one base to obtain a first slurry containing precipitated ferric hydroxide;
    C) treating the first slurry obtained in step B) with hydrogen peroxide, to oxidize any oxidizable nucleotides present, and with an alkali metal fluoride to obtain a second slurry;
    D) filtering the second slurry of step C) to remove the precipitated ferric hydroxide and any impurities absorbed on the precipitated ferric hydroxide and to obtain a filtrate;
    E) passing the filtrate from step D) through an anion exchange column maintained at a temperature of below about 35° C. so as to absorb nucleotides onto said anion exchange column to obtain an eluent;
    F) adjusting the pH of the eluent of step E) to a pH of from about 10 to about 11 with at least one base selected from the group consisting of alkali metal hydroxides and alkali metal carbonates to obtain a product; and
    G) filtering the product from step F) to recover metals in a carbonate or hydroxide form.

2. The process of claim 1 wherein the volumetrically contaminated radioactive metal is comprised of a metal selected from the group consisting of nickel, lead, cadmium, zinc, copper, manganese, silver and alloys thereof.

3. The process of claim 1 wherein the acid used in step A) is nitric acid.

4. The process of claim 1 wherein the acid used in step A) is sulfuric acid.

5. The process of claim 1 wherein a metal carbonate is recovered in step G).

6. The process of claim 1 wherein the iron salt in step A) is ferric nitrate.

7. The process of claim 1 wherein a soluble aluminum salt is additionally combined with the acid solution to provide the first solution.

8. The process of claim 1 wherein the hydrogen peroxide used in step C) is in the form of a 35% by weight aqueous solution of hydrogen peroxide.

9. The process of claim 1 wherein nickel carbonate is recovered in step G).

10. The process of claim 1 wherein the acid solution in step A) is maintained at a temperature of about 30° C. to about 40° C.

11. The process of claim 1 wherein in step A) the radioactive metals are first dissolved in the acid solution before combining with the iron salt or iron oxide.

12. A process for the decontamination of radioactive nickel, wherein the process comprises the steps of:
    a) dissolving radioactive nickel particles in aqueous nitric acid under an inert atmosphere to obtain a first solution;

b) adding 0.5 to about 2.0% by weight of ferric nitrate, based on the weight of radioactive nickel particles, to the first solution obtained in step a) to obtain a second solution;

c) neutralizing the second solution from step b) with calcium hydroxide and at least one alkali metal hydroxide to a pH of about 4.5 to about 5 to obtain a first slurry containing precipitated ferric hydroxide;

d) adding a solution of hydrogen peroxide to the first slurry obtained in step c) to oxidize any nucleotides present to obtain a second slurry;

e) adding a solution of sodium fluoride to the second slurry to precipitate soluble calcium present in the second slurry to obtain a third slurry;

f) filtering the third slurry of step e) to obtain a filtrate and passing the filtrate through a strong anion exchange column which has been conditioned and adjusted to a pH of 5 and a temperature below 35° C. to obtain an eluent;

g) adjusting the eluent obtained in step f) with an alkali metal carbonate to a pH of from about 10 to about 11 to obtain a product; and h) filtering the product obtained in step g) to recover nickel carbonate.

13. The process of claim 12 wherein sodium carbonate is added in step g).

14. The process of claim 12 comprising an additional step of regenerating the anion exchange column following step f) to recover Tc99.

* * * * *